Nov. 10, 1942.  M. A. EDWARDS ET AL  2,301,689
CONTROL SYSTEM
Filed Jan. 22, 1942
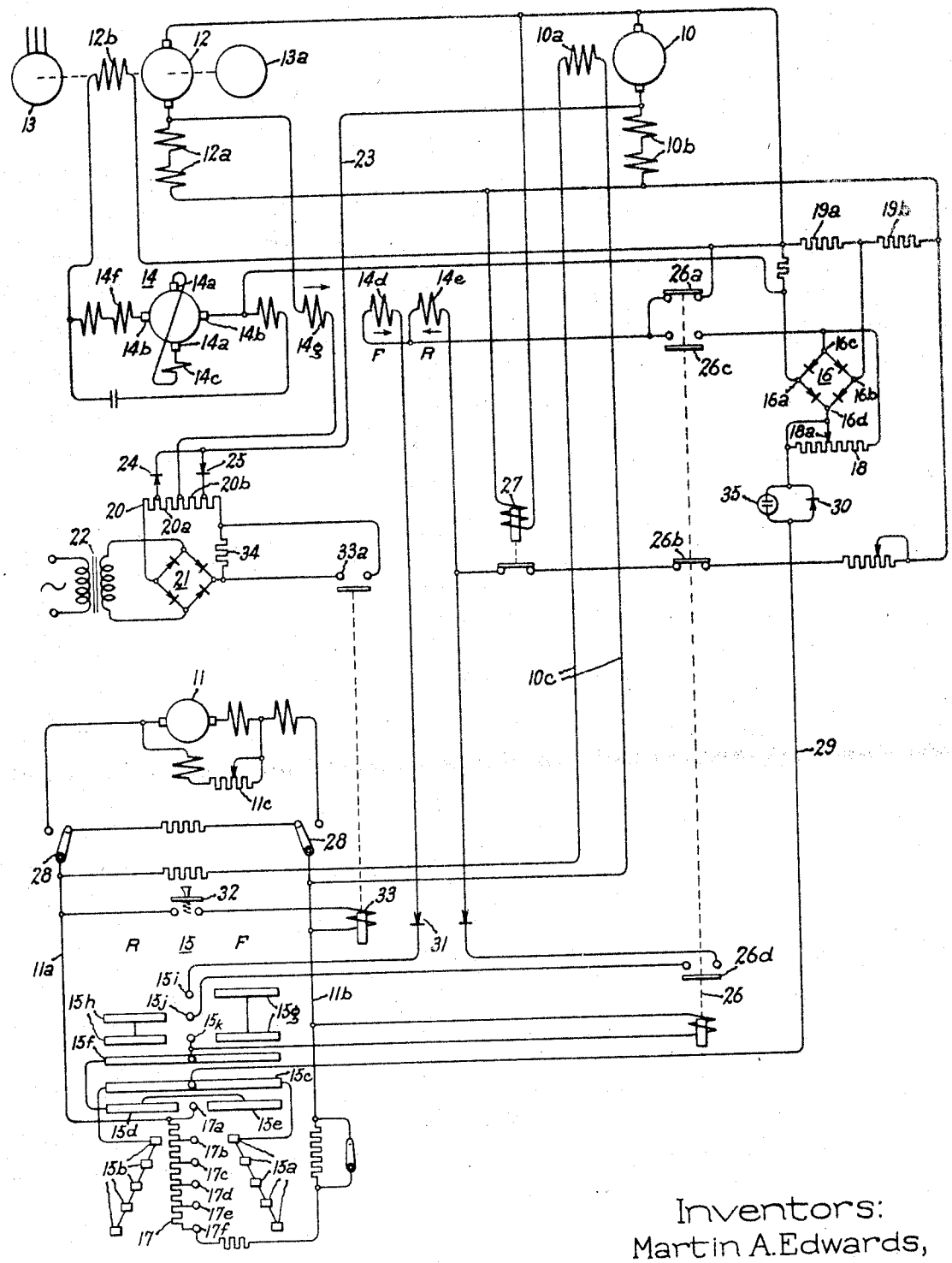
Inventors:
Martin A. Edwards,
Russell S. Sage,
Harold B. La Roque,
by Harry E. Dunham
Their Attorney.

Patented Nov. 10, 1942

2,301,689

UNITED STATES PATENT OFFICE 2,301,689

CONTROL SYSTEM

Martin A. Edwards, Scotia, Russell S. Sage, Schenectady, and Harold B. La Roque, Scotia, N. Y., assignors to General Electric Company, a corporation of New York Application January 22, 1942, Serial No. 427,786

9 Claims. (Cl. 172—152)

This invention relates to control systems, more particularly to systems for controlling the operation of electric motors, and it has for an object the provision of a simple, reliable, inexpensive and improved control system of this character.

More particularly, the invention relates to electric motor control systems for mine hoists and the like in which the motor is supplied from a generator, the voltage of which may be adjusted by means of a manually operated master controller to vary the speed of the motor, and a more specific object of the invention is the provision of a combined starter and regulator for maintaining the voltage supplied to the motor constant at a value corresponding to the speed for which the manually operated controller is set, irrespective of variations in load on the motor.

Another object of the invention is the provision of means for limiting the current transmitted between the motor and generator to a predetermined maximum permissible value.

In mine hoist drives, the load frequently varies from peak values to light loads. Because of this wide variation in the load, the motor which drives the adjustable voltage generator may have a maximum output which is considerably smaller than the peak loads which are encountered and may be provided with a flywheel for storing energy during periods of light load and supplying energy to the generator during peak loads. However, as the flywheel gives up its energy, its speed, and likewise the speed of the generator, decreases with the result that the voltage supplied to the load motor decreases. This causes the speed of the motor to decrease to a value which is substantially less than that for which the master controller is set. This regulation of the motor speed is undesirable, and a further object of the invention is the provision of means for maintaining the speed of the hoist motor constant during periods of peak load.

In carrying the invention into effect in one form thereof, a motor such as the hoist motor of a mine hoist drive is supplied from a generator that is provided with means for adjusting its voltage to vary the speed of the motor. The motor is accelerated to any desired speed and its speed maintained constant at the desired value by means of a combined starter and voltage regulator. This starter and regulator comprises a source of reference voltage and means for deriving a control voltage from the terminal voltage of the motor. The excitation of the supply generator is controlled by means of a special armature reaction excited dynamoelectric machine having a control field winding that is connected to be energized by the difference of the reference voltage and control voltage so that the terminal voltage of the motor is brought to correspondence with the reference voltage, and means are provided for adjusting the reference voltage, thereby to effect acceleration of the motor to a speed corresponding to the reference voltage.

For a better and more complete understanding of the invention, reference should now be had to the following specification and to the accompanying drawing, the single figure of which is a simple, diagrammatical illustration of an embodiment of the invention.

Referring now to the drawing, an electric motor 10 is connected to drive a load such as the cage of a mine hoist (not shown). This motor is illustrated as a direct current motor provided with a separately excited shunt field winding 10a. This field winding may be excited from any suitable source of excitation such as the exciter 11 to the terminals of which the field winding 10a is connected by means of conductors 10c.

The armature of the hoist motor 10 is supplied from an adjustable voltage direct current generator 12 which is driven at a speed that is preferably substantially constant by suitable driving means such as the induction motor 13. As shown, the armatures of the motor 10 and generator 12 and their respective commutating field windings 10b and 12a are connected in a series loop circuit. The voltage of generator 12 can be varied over a wide range by varying its excitation, and to this end the generator 12 is provided with a separately excited shunt field winding 12b which is excited by means of a special cross armature reaction excited direct armature reaction compensated dynamoelectric machine 14. The dynamoelectric machine 14 differs from a conventional direct current machine in that it has a pair of auxiliary brushes 14a arranged on an axis that is normally displaced substantially 90 electrical degrees from the axis of the main load brushes 14b. These auxiliary brushes 14a are substantially short circuited by an external conductor which may or may not include in series therewith a low resistance field winding 14c. A main control field winding comprising two coils 14d and 14e is arranged on the axis of the main load brushes and provides a relatively small number of ampere turns. However, the relatively small voltage induced in the armature between the auxiliary brushes by means of the control flux produces a very large current in the short circuit, and this short circuit current gives rise to a very large cross armature flux in line with the short circuited brushes and therefore across, or at an angle, to the ordinary load current armature reaction which is normally substantially in line with the main load brushes 14b. It is this cross armature reaction flux which provides the main operating flux or excitation for the machine. By reason of the low inductance and low resistance of the circuit including the auxiliary brushes, a very small change in the control flux will produce a very large and a very rapid change in the voltage between the main brushes 14b. A series winding 14f is connected in circuit with the main brushes for substantially completely neutralizing or compensating for the direct armature reaction of the machine.

The control field winding coils 14d and 14e are arranged to be connected for selective and reverse energization thereby to provide for generation of voltage of either polarity by the supply generator 12 and thereby to provide for operation of the motor 10 in either direction as desired. It may be assumed that the direction in which the motor 10 rotates when the field winding coil 14d is energized is the forward direction and conversely, that the direction in which the motor 10 rotates when the coil 14e is energized is the reverse direction.

The excitation of the control field winding coils 14d and 14e is jointly controlled by means of a master control switching mechanism 15 and a full wave rectifier network circuit 16 energized in accordance with the voltage supplied to the terminals of the hoist motor 10. The master switch 15 is illustrated as a manually operated multiposition reversing type master switch. A potentiometer resistor 17 is connected across the terminals of the exciter 11 so that the voltage of the exciter is applied across the potentiometer resistor. This potentiometer resistor is provided with a series of stationary finger contacts 17a, 17b, 17c, 17d, 17e, and 17f. As shown, the master switch is provided with two series of movable contacts 15a and 15b which are so arranged that they progressively make contact with the stationary contacts as the master switch is advanced through its operating positions in either direction. All of the movable contacts of the two groups 15a and 15b are connected together and the junction point of the two groups is connected by means of a conductor to the segment 15c of the master switch. As the master switch is advanced through its successive operating positions the voltage of the segment 15c is varied. In other words, the effect is the same as though the segment 15c were a slider being advanced along the potentiometer 17. The segments 15d and 15e of the master switch are so designed that one or the other of them makes contact with the stationary finger 17a in all positions of the master switch except the off position. These segments are connected together by means of a jumper and are also connected by jumpers to the segment 15f of the master switch. Since the finger 17a of the master switch is connected to one side of the excitation source, a voltage appears across the segments 15c and 15f in all positions of the master switch except the off position, and the magnitude of this voltage depends upon the position to which the master switch is advanced.

This voltage serves as a reference voltage for controlling the speed of the motor 10, and with this reference voltage, a control voltage derived from the voltage applied to the terminals of the motor 10 is compared. The segments 15c and 15f, across which the reference voltage appears, are connected in a series circuit including the resistor 18 and one or the other of the control field winding 14d, 14e of the dynamoelectric machine 14 and thence through one or the other of the pairs of reversing segments 15g or 15h of the master switch.

The control voltage which is to be compared with the reference voltage is derived from the voltage supplied to the motor 10 by means of the full wave rectifier network 16 whose input terminals are connected across the portion 19a of a voltage divider which comprises the resistors 19a and 19b connected in series relationship across the terminals of the motor 10. Since the voltage drop across the portion 19a of the voltage divider which is applied to the input terminals 16a and 16b of the rectifier is proportional to the voltage applied to the terminals of the motor 10, the voltage of the output terminals which is applied across the active portions of the resistor 18 is also proportional to the voltage applied to the terminals of the motor 10. The polarity of the voltage across the output terminals of the rectifier 16 is independent of the polarity of the input voltage and is therefore also independent of the polarity of the voltage applied to the terminals of the motor 10 from which the input voltage is derived. The output terminals 16c and 16d of the rectifier are so connected to the active portion of the resistor 18 that the output voltage opposes the reference voltage derived from the potentiometer 17. Assuming the right-hand excitation bus 11b to be the positive bus, then the positive output terminal 16d of the rectifier will be connected to the movable contact 18a of the variable resistor, and the output terminal 16c will be connected to the other terminal of the active portion of resistor 18. Although the rectifier 16 may be of any suitable type, it is preferably a surface contact type rectifier such, for example, as the well-known copper oxide rectifier.

For the purpose of limiting the current transmitted between the armatures of the generator 12 and the motor 10 to a predetermined safe value, the armature reaction excited dynamoelectric machine 14 is provided with an additional field winding 14g arranged on the load axis of the machine and connected so that it acts differently with respect to the energized coil of the control field winding. This additional field winding 14g is energized by a voltage equal to the difference between a reference voltage and a voltage proportional to the current transmitted between the armatures of the generator and motor. This reference voltage is supplied to a potentiometer 20 which is connected to the output terminals of a full wave rectifier 21 the input terminals of which are connected through a transformer 22 to a suitable source of alternating voltage. As indicated, the rectifier 21 is preferably of the same type as the rectifier 16.

The voltage proportional to the current transmitted between the armatures of generator 12 and motor 10 is provided by means of a suitable voltage drop device included in the armature loop circuit. Although a suitable shunt or resistor may be employed for this purpose, it is preferred to utilize the voltage drop across the commutating field windings 12a and 10b. The armature terminal of the commutating field winding 10b is connected by means of conductor 23 and reversely connected half wave rectifiers 24 and 25 to points of different voltage on the potentiometer 20, and an intermediate voltage point on the potentiometer 20 is connected to one terminal of the field winding 14g. The other terminal of the field winding 14g is connected to the armature terminal of the commutating field winding 12a. The reversely connected rectifiers 24 and 25 provide for comparing the voltage drop across the commutating field windings 12a and 10b with the voltage across one or the other of the portions 20a or 20b of the potentiometer 20, depending upon the direction of current flow between the armatures of the generator and motor, and also serve to prevent energization of the current limit field winding 14g at all times when the current transmitted between the armatures of the generator 12 and motor 10 is less than the predetermined safe value.

When the lower armature terminal of the generator 12 is positive and when the voltage drop across the commutating field windings 12a and 10b exceeds the voltage drop across the portion 20a of the potentiometer 20, current will flow through the field winding 14g in the direction indicated by the solid arrow. When the current transmitted between the generator and the motor is in the reverse direction and the voltage drop across the commutating field windings 12a and 10b exceeds the voltage drop across the portion 20b of the potentiometer, current will flow through the field winding 14g in the reverse direction.

A contactor 26 under the control of the master switch 15 serves when operated to its closed position to complete the excitation circuit between the rectifier 16 and the field coils 14d and 14e of the control field winding of dynamoelectric machine 14. When contactor 26 is deenergized and dropped out, its normally closed contacts 26a, 26b prepare for the completion of an excitation circuit from the control field winding coil 14e to the armature terminals of the motor 10 by the contactor 27 when the terminal voltage of the motor 10 decreases to a predetermined value.

With the foregoing understanding of the apparatus and its organization in the system, the operation of the system itself will readily be understood from the following detailed description. The switching device 28 is operated to the position in which it connects the terminals of the exciter 11 to the excitation busses 11a and 11b. It may be assumed that the exciter 11 is being driven by suitable driving means (not shown) and that it is generating a voltage of the desired value as determined by the setting of the field rheostat 11c.

The motor 10 is started in the forward direction by advancing the master switch 15 to its first forward operating position in which the segment 15e makes contact with the finger 17a, thereby completing an energizing circuit for the operating coil of contactor 26. This circuit is traced from the positive excitation bus 11b through the operating coil of contactor 26 to segments 15f and 15d of the master switch to the negative excitation bus 11a. Contactor 26 responds to the energization of its operating coil to open its normally closed contacts 26a and 26b to disconnect the control fluid winding coil 14e from the terminals of the motor 10 and to close its normally open contacts 26c and 26d. Contact 26c in closing completes the circuit between the rectifier 16 and the control field coil 14d. The complete circuit of the control field coil is traced from the positive excitation bus 11b to the stationary finger 17b and cooperating segments of the master switch to the segment 15c and thence through conductor 29 and rectifier 30, potentiometer resistor 18 and contact 26c to and through field coil 14d, half wave rectifier 31, fingers 15i and 15k of the master switch bridged by segments 15g and thence to segment 15f and the negative excitation bus 11a.

As a result of the excitation of its control field winding 14d, current is caused to flow in the short circuit of the dynamoelectric machine 14, and this short circuit current produces a cross armature reaction flux which causes current to be supplied from the load brushes 14b to the main field winding 12b of the adjustable voltage generator 12. As a result, generator 12 generates a voltage which is supplied to the armature terminals of the motor 10 and this causes the motor 10 to accelerate. The voltage supplied to the terminals of the motor 10 produces a voltage at the output terminals of the rectifier 16 which opposes the reference voltage between the segments 15c and 15f of the master switch and as a result, the control field coil 14d is energized by the difference between this opposing voltage and the reference voltage. Since the control voltage derived from the motor terminals opposes the reference voltage, the excitation of the field coil 14d is decreased. However, the acceleration of the motor continues until the difference between the control voltage and the reference voltage is such that any further increase in the control voltage would produce a decrease in the speed of the motor 16; in other words, the acceleration continues until a balance is established in the system.

The acceleration of the motor to maximum speed is completed by advancing the master switch 15 through its successive operating positions to its final position. At each operating position of the master switch, the speed of the motor 10 is accelerated to a new high value corresponding to the position of the master switch in the manner described in connection with the operation of the master switch to the first position.

During periods when the motor 10 is at rest or during periods when the load on the motor 10 is less than the maximum power output of the induction motor 14, energy is stored in the flywheel 13a. On the other hand, during periods when the load on the hoist motor 10 exceeds the maximum power output of the induction motor 13, the speed of the induction motor decreases and as a result, the flywheel 13a gives up its energy to the system to make up for the deficiency between the power demanded by the load and the amount which the induction motor 13 is able to supply. As a result, the voltage of the supply generator 12 decreases and this of course reduces the speed of the hoist motor 10. In the absence of any means for maintaining the voltage applied to the motor 10 substantially constant during periods of peak load, the decrease in the speed of the motor 10 as a result of the decrease in the voltage of the generator 12 would attain a very substantial value and this would be highly undesirable. This undesirable operating condition is entirely eliminated in the following manner. As the voltage applied to the motor 10 tends to decrease, the difference between the control voltage across the output terminals of the rectifier 16 and the reference voltage increases, with the result that the excitation of the dynamoelectric machine 14 is increased and the excitation and voltage of the generator 12 are correspondingly increased. As a result, the speed of the motor 10 is increased and this increase in speed continues until the balanced condition between the control voltage and the reference voltage is reestablished, which occurs when the speed of the motor 10 is restored to the correct value corresponding to the operating position of the master switch 15. Thus, the voltage supplied to the motor 10 and the speed thereof are regulated and maintained substantially constant at values corresponding to the operating position of the master switch at all times during the operation.

When the current transmitted between the armatures of the generator 12 and motor 10 is less than a predetermined safe value, the field winding coil 14g is entirely deenergized. However, if the current should exceed this predetermined safe value, the field winding coil 14g will become energized in a direction to oppose the excitation of the control field winding. Assuming the current in the armature circuit of the generator 12 and motor 10 to be flowing in the direction from the lower terminal of the generator to the lower terminal of the motor, current will begin to flow in the current limit field winding 14g in the direction of the solid arrow when the voltage drop across the commutating field windings 12a and 10b exceeds the voltage drop across the portion 20a of the potentiometer and conversely, when the current flow is in the opposite direction, current will flow in the opposite direction through the current limit field winding 14g when the voltage drop across the commutating field windings 12a and 10b exceeds the voltage drop across the portion 20b of the potentiometer. As a result of the excitation of the current limit field winding 14g, the voltage of the generator 12 is reduced until the current transmitted between the generator and motor decreases to the predetermined safe value, at which value the voltage drop across the commutating field windings 12a and 10b is less than the voltage drop across the portion of the potentiometer 20 with which the commutating field voltage drop is being compared. This current limit feature is effective at all times during the operation of the system and serves to limit the current supplied by the generator 12 to the motor 10 in either direction and also serves to limit the pump back current between the motor 10 and the generator 12 during overhauling load conditions.

As an added feature, a maximum torque push button 32 and maximum torque contactor 33 controlled thereby are provided whereby the operator may recalibrate the current limit setting of the current limit control means, so as to obtain additional torque on the hoist motor, in case this is desirable for emergency operation. This push button 32 is preferably of the momentary contact type, and may be operated by pressure from the operator's foot and is preferably so located that the operator cannot comfortably maintain such operation for an extended period. Depression of the push button 32 causes the contactor 33 to close contacts 33a and short circuit the resistor 34 which is in circuit between the output terminals of the rectifier 21 and the potentiometer resistor 20. As a result, the reference voltage applied to the potentiometer 20 is increased and consequently, a current which substantially exceeds the predetermined safe value can be transmitted between the generator 12 and motor 10 before the voltage drop across the commutating field windings 12a and 10b will equal the new voltage drop across the active portion of the potentiometer 20 to render the current limiting means effective.

If, during conditions of overhauling load, or if for any other reason such as notching back the master switch too rapidly toward the off position, the terminal voltage of the motor 10 should become greater than the reference voltage across the segments 15c and 15f, the half wave rectifier 30 which is included in the control field circuit will prevent the terminal voltage of the motor from reversing the excitation of the control field winding of the dynamoelectric machine 14.

The speed of the motor 10 may be decelerated to any desired lower value by notching back the master switch to a lower speed operating position or to the central off position. If notched back to the off position, the operating circuit for the energizing coil of contactor 26 will be interrupted and in response to deenergization, contactor 26 will open its normally open contacts 26c and 26d and will close its normally closed contacts 26a and 26b. Contact 26c in opening interrupts the excitation circuit of the control field winding coil 14d, and contacts 26a and 26b in closing prepare or partially complete an energizing circuit from the armature terminals of the motor 10 to the reverse control field winding coil 14e. When the voltage of the motor 10 has decreased to a predetermined low value, the voltage responsive relay 27 will drop out and close its contacts to complete this excitation circuit for the reverse field winding coil 14e. As a result, the terminal voltage of the motor 10 reverses the excitation of the armature reaction excited dynamoelectric machine 14 which in turn reverses its voltage, thereby to apply reverse voltage to the field winding 12b of the supply generator. As a result, the voltage of the supply generator is forced to decay very rapidly and when it attains zero value, this decay forcing action terminates.

The reverse operation of the system is identical with the forward operation with the exception that the master switch is advanced through its left-hand operating position and the reversing segment 15h connects the reverse control field winding 14c of the armature reaction excited dynamoelectric machine in the excitation circuit. When the motor 10 is operating in the reverse direction, the polarity of its terminal voltage is also reversed and consequently when the master switch 15 is notched back from a reverse operating position to the off position, the voltage applied to the reverse field winding 14e will be in the correct direction to force the decay of the generator voltage in the manner described in connection with the forward operation.

If desired, a suitable high resistance device such for example as the glow tube 35 may be connected across the rectifier 30. Thus, although the rectifier 30 prevents reversal of the control field of the armature reaction excited dynamoelectric machine 14 when the voltage derived from the terminals of the hoist motor exceeds the reference voltage, as when the master switch is being notched back from an operating position to the off position, the glow tube 35 will allow a very small amount of reverse current to flow in the control field winding thereby to initiate the deceleration. Furthermore, the glow tube 35 acts as an indicating device. During the accelerating period current flows through the rectifier 30 in the intended direction. Consequently, the voltage drop across the rectifier is insufficient to cause current to flow through the glow tube 35 and the glow tube will therefore be dark. However, if the rectifier 30 is open circuited, one of the plates of the glow tube 35 will glow during the starting-up period, thereby giving an indication of a fault in the rectifier circuit. During the decelerating period when the master switch is being notched back toward the off position, current cannot flow in the reverse direction through the rectifier 30, and accordingly, a voltage can build up across the rectifier which is sufficient to cause current to flow through the glow tube in the reverse direction, and accordingly, this will cause the other plate of the glow tube to glow. If the rectifier 30 should be short circuited, the glow tube will not glow at any time during the operation of the system. Thus the glow tube 35 indicates the condition of the rectifier circuit at all times during the operation of the system.

Although in accordance with the provisions of the patent statutes this invention has been described as embodied in concrete form and the principle thereof has been explained together with the best mode in which it is now contemplated applying that principle, it will be understood that the apparatus shown and described is merely illustrative and that the invention is not limited thereto, since alterations and modifications will readily suggest themselevs to persons skilled in the art without departing from the true spirit of this invention or from the scope of the annexed claims.

What we claim as new and desire to secure by Letters Patent of the United States is:

1. A control system for hoists and the like comprising in combination, an adjustable voltage generator, an electric motor supplied therefrom, a combined starter and voltage regulator comprising a source of voltage, means for deriving from said source a reference voltage proportional to a desired operating speed of said motor, means for deriving a control voltage from the terminal voltage of said motor, and means for controlling the excitation of said generator comprising a cross armature reaction excited direct armature reaction compensated dynamoelectric machine provided with a control field winding connected to be excited by the difference of said reference voltage and said control voltage, and means for adjusting said reference voltage thereby to effect acceleration of said motor, and means for limiting the current transmitted between said motor and generator to a predetermined value comprising an additional field winding on said dynamoelectric machine connected to be excited by the armature current of said motor and to oppose said control field winding.

2. A control system for hoists and the like comprising in combination, an adjustable voltage generator, an electric motor supplied therefrom, a combined starter and voltage regulator comprising a source of voltage, means for deriving from said source a reference voltage proportional to a desired operating speed of said motor, means for deriving a control voltage from the terminal voltage of said motor comprising a full wave rectifier connected to the terminals of said motor for producing a rectified voltage of constant polarity irrespective of the polarity of said motor terminal voltage, and means for controlling the excitation of said generator comprising a cross armature reaction excited direct armature reaction compensated dynamoelectric machine provided with a control field winding connected to be excited by the difference of said reference voltage and said rectified control voltage, and means for varying said reference voltage thereby to accelerate said motor, and means for limiting the current transmitted between said generator and motor to a predetermined value comprising an additional field winding on said dynamoelectric machine connected to be excited by the armature current of said motor and to oppose said control field winding.

3. A control system for hoists and the like comprising in combination, an adjustable voltage generator, an electric motor supplied therefrom, a combined starter and voltage regulator comprising a source of direct current, means for deriving from said source a reference voltage proportional to a desired operating speed of said motor, means for deriving a control voltage from the terminal voltage of said motor comprising a full wave rectifier connected to the terminals of said motor for producing a rectified voltage of constant polarity irrespective of the polarity of said motor terminal voltage, means for controlling the excitation of said generator comprising a cross armature reaction excited direct armature reaction compensated dynamoelectric machine provided with a control field winding connected in a series circuit with said reference voltage and control voltage deriving means, and a rectifier included in said series circuit for preventing reversal of the excitation of said control field winding by said terminal voltage during normal operation.

4. A control system for hoists and the like comprising in combination, an adjustable voltage generator, an electric motor supplied from said generator, starting means for said motor comprising a direct current source, means for deriving from said source a reference voltage proportional to a desired operating speed of said motor, means for deriving a control voltage from the terminal voltage of said motor and means for controlling the excitation of said generator comprising a cross armature reaction excited direct armature reaction compensated dynamoelectric machine provided with a control field winding connected to be excited by the difference of said control voltage and said reference voltage and means for varying said reference voltage to accelerate said motor, and means for limiting the current transmitted between said generator and motor in both directions comprising a source of reference potential, a voltage drop device connected in circuit between said generator and motor, electrical connections including reversely connected rectifiers from points of different potential of said reference potential source to one terminal of said voltage drop device and a second field winding on said dynamoelectric machine connected between the opposite terminal of said voltage drop device to a point of intermediate potential of said reference potential source so as to oppose the excitation of said control field winding.

5. A control system comprising in combination, an adjustable voltage generator, an electric motor supplied from said generator, starting means for said motor comprising a source of adjustable voltage, means for deriving a control voltage from the terminals of said motor and means for controlling the excitation of said generator comprising a cross armature reaction excited direct armature reaction compensated dynamoelectric machine provided with a main control field winding connected to be excited by the difference of said voltages, means for limiting the current transmitted between said generator and motor to a predetermined value comprising a source of reference voltage, a voltage drop device connected in the circuit between said generator and motor, electrical connections from one terminal of said voltage drop device to points of different voltage of said reference voltage source, an auxiliary field winding on said dynamoelectric machine connected from the other terminal of said voltage drop device to a point of intermediate voltage of said reference voltage source, and reversely connected rectifiers included in said connections to provide for energization of said auxiliary winding to oppose said main field winding in response to transmission of current in either direction between said generator and motor and only when the voltage drop across said voltage drop device exceeds the voltage between said intermediate connection and either of said points of different voltage.

6. A control system comprising in combination, an adjustable voltage generator, an electric motor supplied therefrom, a combined motor starter and regulator for the voltage supplied to said motor comprising a source of direct current, means for deriving a reference voltage from said source, means for deriving a control voltage from the terminals of said motor, means for controlling the excitation of said generator comprising a dynamoelectric machine provided with a control field winding connected to be excited by the difference of said voltages and a master switching device having an off position and operable to an operating position for varying said reference voltage to accelerate said motor, a rectifier connected in circuit with said control field winding to prevent reversal of the excitation thereof by the voltage supplied to said motor during normal operation, and means responsive to return of said master switch to said off position for interrupting the excitation of said control field winding and for providing for excitation of said control field winding by the terminal voltage of said motor in a direction to force the decay of the field of said generator.

7. A control system comprising in combination, an adjustable voltage generator, an electric motor supplied therefrom, a combined starter and regulator for the voltage supplied to said motor comprising a source of direct current, means for deriving a reference voltage from said source, means for deriving a control voltage from the terminals of said motor comprising a full wave rectifier connected to the terminals of said motor, means for controlling the excitation of said generator comprising a dynamoelectric machine provided with a control field winding connected in circuit with said control voltage and reference voltage producing means, and a master switch having an off position and operable to an operating position for varying said reference voltage to accelerate said motor, a unidirectional conducting device included in said circuit for preventing reversal of the excitation of said dynamoelectric machine by the voltage supplied to said motor during normal operation of said motor, and means responsive to the return of said master switch to off position for interrupting the excitation circuit of said control field winding and providing for excitation of said dynamoelectric machine by the terminal voltage of said motor in a direction to force the decay of the voltage of said generator.

8. A control system comprising in combination, a motor and an adjustable voltage generator and flywheel driven thereby, said motor having a predetermined maximum power output capacity, a load motor supplied from said generator for driving a load having short duration peak values in excess of said maximum output capacity, a combined starter and voltage regulator comprising a source of voltage, means for deriving a reference voltage from said source proportional to a desired operating speed of said motor, means for deriving a control voltage from the terminal voltage of said load motor, and means for controlling the excitation of said generator to maintain the terminal voltage of said motor substantially constant during said peak loads comprising a cross armature reaction excited direct armature reaction compensated dynamoelectric machine provided with a control field winding connected to be excited by the difference of said reference voltage and said control voltage, and means for varying said reference voltage thereby to effect acceleration of said load motor.

9. A control system comprising in combination, an adjustable voltage generator, an electric motor supplied therefrom, a combined motor starter and regulator for the voltage supplied to said motor comprising a source of direct current, means for deriving a reference voltage from said source, means for deriving a control voltage from the terminals of said motor, means for controlling the excitation of said generator comprising a dynamoelectric machine provided with a control field winding connected to be excited by the difference of said voltages and a master switching device having an off position and operable to an operating position for varying said reference voltage to accelerate said motor, a rectifier connected in circuit with said control field winding to prevent reversal of the excitation thereof by the voltage supplied to said motor during normal operation, means responsive to return of said master switch to off position for interrupting the excitation circuit of said control field winding and for preparing an excitation circuit to armature circuit of said motor and generator, and means responsive to a predetermined value of the voltage applied to said motor for completing said excitation circuit in a direction to force the decay of the field of said generator.

MARTIN A. EDWARDS.
RUSSELL S. SAGE.
HAROLD B. LA ROQUE.